UNITED STATES PATENT OFFICE.

JOHN W. WARREN, OF OMAHA, NEBRASKA, ASSIGNOR OF ONE-HALF TO I. H. WARREN, OF ELGIN, ILLINOIS.

CLARIFYING SULFUROUS HYDROCARBON OILS.

SPECIFICATION forming part of Letters Patent No. 666,446, dated January 22, 1901.

Application filed January 25, 1898. Renewed December 19, 1900. Serial No. 40,460. (Specimens.)

*To all whom it may concern:*

Be it known that I, JOHN W. WARREN, a citizen of the United States, residing at Omaha, Nebraska, have invented certain new and useful Improvements in Clarifying, Refining, and Increasing the Illuminating Powers of Petroleum or Hydrocarbon Oils; and I hereby declare the following to be a full, clear, and exact description of the invention, which will enable others skilled in the art to which it appertains to use the same.

My invention relates to a new and improved method for clarifying hydrocarbon oils; and the invention consists in subjecting the oils to the chemical reaction of a clay known as "Wyoming rock-clay," the same being commonly found in the State of Wyoming and which by a chemical analysis is found to contain elements having strong affinities for the refractory sulfonic salts contained in the oils.

Petroleum treated with sulfuric acid contains sulfonic salts, which are allowed to settle so far as they will. The oil is then poured off, is washed with water, and finally treated with clay or fullers' earth; but even this treatment does not wholly remove the tarry substances which go over with the distillation. The washing does not remove the sulfuric acid, and the fullers' earth, which acts only in a mechanical way by precipitation, fails to remove all the sulfonic salts, so that an absolutely transparent oil does not result. In the use of fullers' earth the silica and the alumina unite mechanically with the tarry substances that go over with the distillation and in the precipitation carry it down, making it clearer, but leaving the sulfonic salts. By repeating the operation the oil is improved; but there is always a strong trace of the sulfonic salts present, which is objectionable and which it is my object to eradicate entirely.

Experiment shows that magnesia in any of its compounds and when used in sufficient quantity readily chemically unites with the sulfur in the oil. The best medium for supplying the magnesia I have discovered to be Wyoming rock-clay, which may be found in Wyoming and the adjacent portions of the country. This clay contains: silica, 63.25; aluminium, 12.62; oxides of iron, $3.70\frac{1}{2}$; magnesia, $3.97\frac{1}{2}$; calcium, 4.21; soda, 3.95; potash, one; sulfur, 1.58, and water, 6.71. Other analyses may differ slightly, but not materially. From this analysis it will be seen that this particular clay contains five elements which have a strong and recognized chemical affinity for sulfur—namely, silica, alumina magnesia, calcium, soda, and potash.

To carry out my invention, I take the distilled oil and put into it finely-pulverized Wyoming rock-clay, about one pound to fifty gallons of oil, or I may put into it magnesium carbonate and Wyoming rock-clay mixed together in such quantities as judgment dictates—as, for example, even quantities, such being in accordance with the degree in which the tarry substances and sulfur exist in the oil. If the reaction is at all slow, as will sometimes occur, I agitate it one or more times, and when the chemical reaction is complete the residue settles and the pure oil may be drawn off with or without filtration and may again be washed with water. Ordinarily Wyoming rock-clay without adding the magnesium carbonate will be sufficient, the latter only being added when the tarry substances and sulfur exist in great quantities.

The term "Wyoming rock-clay" is applied to this species for the reason that geologists have failed, so far as I am enabled to ascertain, to give to it any geological name and for the further reason that it is found principally in the State of Wyoming and in the region of Rock creek, Albany county, although it may exist in undiscovered quantities in numerous other sections of the country. I have found this clay, and it can be found to-day, in "Miser's Mine," in section 17, township 21 north, of range 75 west, also in "Wilcox Mine," in section 11, township 22 north, of range 76 west, both in the county of Albany. In color it is a light drab, and when rubbed between the fingers it has a soapy magnesia-like feeling. It may be readily crumbled and powdered, and it is near about the consistency of French chalk, though not so hard. By dipping one end of a piece of the clay in water it will immediately become soft, yet will not dissolve. This moistened end may be readily scraped off with a knife, and when mixed with a few drops of water it will again harden into a kind of putty similar to its natural condition. When powdered and mixed with carbon oil, it remains disintegrated, the oil therefore not having the same effect as the water.

Having described my invention, what I claim is—

1. The herein-described method of clarifying sulfurous hydrocarbon oils, which consists in mixing with the oil disintegrated Wyoming rock-clay, allowing the same to settle, and finally pouring off the oil.

2. The herein-described method of clarifying hydrocarbon oils, which consists in mixing with the oils powdered Wyoming rock-clay and magnesium carbonate, allowing the mass to settle, and finally drawing off the oil.

In testimony whereof I now affix my signature in the presence of two witnesses.

JOHN W. WARREN.

Witnesses:
CHARLES GENENI, Jr.,
CHRIST KALMBACH.